US010926365B2

(12) United States Patent
Wen (10) Patent No.: US 10,926,365 B2
(45) Date of Patent: Feb. 23, 2021

(54) APPARATUS AND METHOD FOR ATTACHING AND DETACHING CIRCULAR ARRAYED FASTENERS (71) Applicant: Hongcai Wen, Mississauga (CA)

(72) Inventor: Hongcai Wen, Mississauga (CA)

(\*) Notice: Subject to any disclaimer, the term of this patent is extended or adjusted under 35 U.S.C. 154(b) by 0 days.

(21) Appl. No.: 16/104,792

(22) Filed: Aug. 17, 2018

(65) Prior Publication Data
US 2020/0001414 A1  Jan. 2, 2020

Related U.S. Application Data

(60) Provisional application No. 62/547,757, filed on Aug. 19, 2017, provisional application No. 62/561,486, filed on Sep. 21, 2017.

(51) Int. Cl.
*B23P 19/06* (2006.01)
*B23P 19/10* (2006.01)
*B60B 29/00* (2006.01)

(52) U.S. Cl.
CPC ............ *B23P 19/069* (2013.01); *B23P 19/10* (2013.01); *B60B 29/001* (2013.01)

(58) Field of Classification Search
CPC ....... B23P 19/069; B23P 19/10; B23P 19/105; B23P 19/12; B60B 29/001
See application file for complete search history.

(56) References Cited

U.S. PATENT DOCUMENTS

| 2,069,882 | A |   | 2/1937  | Hall |   |
|---|---|---|---|---|---|
| 3,848,488 | A | * | 11/1974 | Weisenburger | B25B 21/002 81/475 |
| 4,048,687 | A |   | 9/1977  | Hitachi |   |
| 4,909,105 | A | * | 3/1990  | Namiki | B23P 19/006 81/177.75 |
| 5,837,907 | A | * | 11/1998 | Ohmi | B23P 19/066 73/862.23 |
| 6,134,989 | A | * | 10/2000 | Stevens | B23P 19/069 81/57.22 |
| 6,196,089 | B1 | * | 3/2001  | Choi | B23P 19/069 81/57.22 |
| 8,020,626 | B2 |   | 9/2011  | Francis et al. |   |
| 8,316,739 | B2 | * | 11/2012 | Vollmuth | B60B 29/006 81/57.22 |

(Continued)

FOREIGN PATENT DOCUMENTS

CN    02463458 A   5/2002
EP    1423231 A1   6/2004
(Continued)

*Primary Examiner* — Christopher R Harmon
(74) *Attorney, Agent, or Firm* — Stuart L. Wilkinson (57) ABSTRACT

Screw fastener engaging/disengaging apparatus suitable for attaching/detaching wheels to/from vehicles has a frame and a set of parallel spindles mounted on the frame for holding one type of screw fastener at the spindle ends. The spindle ends are arranged in a circular array with the spindles rotatable about their longitudinal axes. The screw fasteners are configured for screw engagement with screw fasteners of another type mounted on a wheel attachment member to/from which a wheel can be attached/detached. An adjustment mechanism collectively changes positions of the spindle axes between a circular array with a first radius and a circular array with a second radius.

21 Claims, 8 Drawing Sheets

(56) References Cited

U.S. PATENT DOCUMENTS

| | | | | |
|---|---|---|---|---|
| 9,186,761 B1 * | 11/2015 | Al-Motoutah | ........ | B23P 19/069 |
| 2006/0288577 A1 * | 12/2006 | Bormuth | ............... | B23P 19/069 |
| | | | | 29/894 |
| 2009/0297307 A1 * | 12/2009 | Laffitte Figueras | ... | B62D 65/12 |
| | | | | 414/429 |
| 2011/0048649 A1 | 3/2011 | Komatsu et al. | | |

FOREIGN PATENT DOCUMENTS

| | | | | |
|---|---|---|---|---|
| GB | 976609 A | * | 12/1964 | ........... B25B 21/008 |
| GB | 2245205 | * | 1/1992 | |

\* cited by examiner

APPARATUS AND METHOD FOR ATTACHING AND DETACHING CIRCULAR ARRAYED FASTENERS

CROSS REFERENCE TO RELATED PATENTS

The present application claims priority pursuant to 35 U.S.C. 119(e) from U.S. Provisional Application Ser. No. 62/547,757 filed Aug. 19, 2017 and U.S. Provisional Application Ser. No. 62/561,486 filed Sep. 21, 2017. The disclosures of the above-numbered applications are hereby incorporated herein by reference in their entirety and made part of the present application for all purposes.

FIELD OF THE INVENTION

This invention relates to apparatus and methods for automatically attaching/detaching circular arrayed fasteners, such as but not limited to wheel lug fasteners on wheels of automobiles and other road/off road vehicles. Circular arrayed fasteners mean such fasteners whose axes are circular arrayed, or equivalently, where axes of the fasteners are on a notional cylindrical surface and are equally spaced.

BACKGROUND

Automatic wheel attachment apparatus is known in vehicle assembly plants where reasonably predictable assembly stations and stock materials mean easy application of robotics. In less certain surroundings such as vehicle repair sites, there may be the need to handle vehicles that are different from one another and which have a variety of wheel sizes, lug nut sizes, lug nut forms and lug nut patterns, including different fastener quantity and/or different fastener spacing. Moreover, the vehicles themselves may be positioned with attached wheels or wheel attachment members in less-than-ideal positions and orientations.

SUMMARY OF THE INVENTION

Brief Description of the Drawings

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 25 is a perspective view of a tool base for supporting a tool according to an embodiment of the invention, the base including a mechanism for rotating the tool about its center axis.

DETAILED DESCRIPTION OF THE INVENTION INCLUDING THE PRESENTLY PREFERRED EMBODIMENTS

Before the detailed description of the invention, the structure and parameters related to the mounting of a wheel upon a vehicle will be introduced. The wheel of a vehicle is normally attached on a wheel attachment base of a wheel bearing hub generally by a threaded fastener assembly. Generally, a first fastener member such as a hex wheel lug nut is configured for screw engagement with a second fastener member such as a threaded stud integral with wheel attachment base. A part of the wheel is placed between the first fastener and the wheel attachment base, and the engaged fasteners fix the wheel to the attachment base with a suitable tightening torque.

Axes of the wheel fasteners are generally circular arrayed about the wheel axis. In other words, the axes of the wheel fasteners are all on a notional cylindrical surface and are equally spaced. A circle on the cylindrical surface is called the pitch circle of the wheel and the diameter of the notional cylindrical surface is called the pitch circle diameter (PCD) of the wheel. The pattern of wheel fasteners of a wheel is described as: Q×PCD, wherein Q is the quantity of the fasteners. For, example, 5×100 means the wheel has 5 fasteners and a PCD of 100 mm. Different vehicles can be equipped with the same or a different quantity of wheel fasteners with the same or a different PCD. For different vehicles or wheels, even if the quantity of wheel fasteners on a wheel is the same, their PCDs can differ from each other. In geometry, if the quantity of the fasteners is a fixed value, the spacing of adjacent fastener axes and PCD have a one-to-one correspondence.

Fastener member design can vary with many different types and sizes. In one example, the first fastener is a hex wheel lug nut and the second fastener is a threaded stud on the attachment base. In another example, the first fastener is a hex head bolt and the second fastener is a tapped hole in the attachment base. There are also many types and sizes of exterior driving geometry for the first fastener such as hexagonal prism, inner hexagonal prism, torx, inner torx, etc. Common wheel fastener patterns of a car are 5 nut circular arrays and 6 nut circular arrays.

For clarity, the following exemplary embodiments are describe only the situation of a 5 nut circular array having a hex wheel lug nut as the first fastener and a threaded stud as the second fastener but it will be understood that other quantities and types of fasteners may apply. Furthermore, operation of the exemplary tool embodiments is described for a wheel detachment procedure but it will be understood that the tool can be used also for wheel attachment. In the latter case, the procedure is much the same as for detachment, except that the sockets are collectively pre-loaded with lug nuts or the lug nuts are loose fitted to the studs on the wheel attachment member. The tool is then operated so as to screw tighten lug nuts onto the studs instead of untightening and releasing them.

Figure 1:
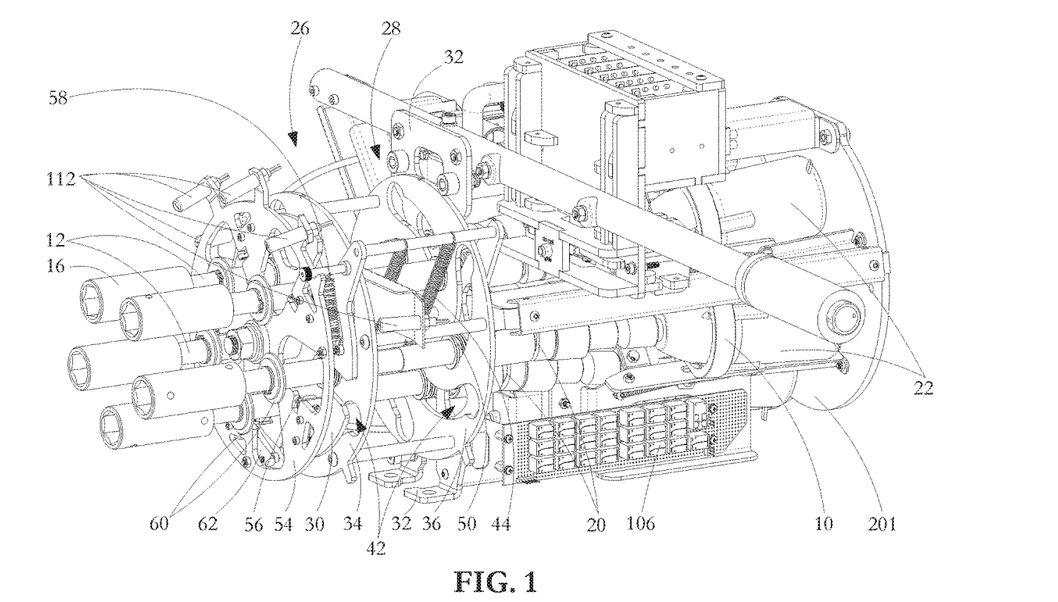
FIG. 1 is a perspective view from one side of a threaded fastener engaging/disengaging tool according to one embodiment of the invention.

Referring in detail to FIG. 1, a threaded fastener engaging/disengaging tool for use in attaching/detaching wheels to/from vehicles has a set of five spindles 12, the spindles being mounted with their longitudinal axes parallel with the spindles being rotatable about their longitudinal axes. The spindle axes are parallel circular arrayed. In other words, the spindle axes extend along a notional cylindrical surface and are equally spaced. Front ends of the spindles are each formed with a standard interface shape such as a half inch square solid head or a socket although the size and form of interface shape can be different. Sockets 16 mountable at the spindle front end drives are adapted to hold and rotate threaded fasteners (not shown) such as lug nuts. The threaded fasteners are configured for screw engagement with threaded fasteners (not shown) of a compatible type such as threaded bolts mounted on a wheel attachment member to/from which a wheel is to be attached/detached. Rear ends 18 (FIGS. 5 and 7) of the spindles are attached by universal joints 20 to respective motors 22 operable to rotate the spindles 12 about their longitudinal axes. The motors 22 are mounted to annular seating parts 10 of a frame so as to permit angular movement of the motors 22 to accommodate changes in the position of the motor front ends caused by movement of the spindle inner ends 18 acting through the universal joints 20. An adjustment mechanism is used for synchronously altering the spindle axes between positions on a notional cylindrical surface having a first diameter and positions on a notional cylindrical surface having a different diameter.

Figure 2:
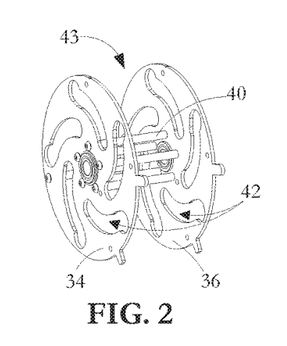
FIG. 2 is a perspective view of a cam unit being part of the threaded fastener engaging/disengaging tool of FIG. 1.
Figure 3:
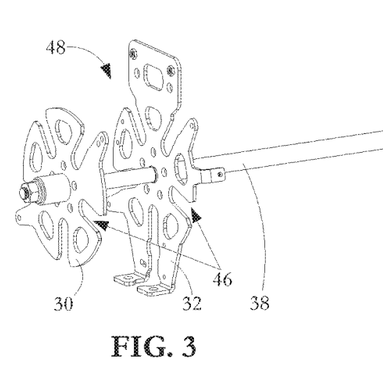
FIG. 3 is a perspective view of a guide unit being part of the threaded fastener engaging/disengaging tool of FIG. 1.
Figure 4:
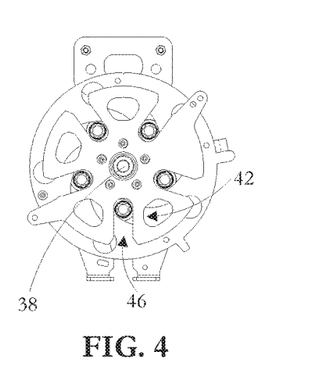
FIG. 4 is a front view of the threaded fastener engaging/disengaging tool of FIG. 1 showing spindle ends occupying positions on a circular locus.

In the embodiment of FIG. 1, the adjustment mechanism includes a guide unit 48 (FIG. 3) and a cam unit (FIG. 2), the units and center shaft 38 being coaxially mounted. As shown in the detail view of FIG. 3, the guide unit 48 has parallel plate members 30, 32 connected by center shaft 38 and rods 41, the guide unit being fixed to the tool frame when the tool is fully assembled. Each of the plate members 30, 32 has five generally radially extending apertures 46 circularly arrayed about the axis of center shaft 38, with the apertures 46 of plate member 30 aligned with the apertures 46 of plate member 32. As shown in the detail view of FIG. 2, the cam unit 43 has parallel plate members 34, 36 connected by rods 40. Each of the plate member 34, 36 has five arcuate apertures 42 circularly arrayed about the axis of center shaft 38 with the apertures 42 of plate member 34 aligned with the apertures 42 of plate member 36. The cam unit 43 is normally biased by springs 44 to the position shown in FIG. 4 but can be driven to change the spacing of spindles 12 by linear motor 45 (FIG. 9B) which is linked to anchor point 39 at one of the connecting rods 40 by the wire of a Bowden cable 47, the Bowden cable sleeve being fixed to a second, adjacent connecting rod 41 with the Bowden wire freely slidable in an aperture through the second rod 41. When mounted to one another, the guide unit 48 and the cam unit 43 form spaced adjustor units 26, 28, with plate members 30, 34 forming adjustor unit 26 and plate members 32, 36 forming adjustor unit 28. Both the apertures 42 and 46 in adjustor unit 26 and the apertures 42 and 46 in adjustor unit 28 have aperture overlaps, the two overlaps having the same shape and being aligned with one another on an axis parallel to the axis of the center shaft. Each spindle is positioned inside the two axially aligned aperture overlaps. Each spindle is mounted on bearings 50 having a bearing interface with boundaries of the aperture overlaps. Consequently, the spindles 12 are held with their axes parallel by bearings 50 at the two adjustor units 26, 28 where the spindle positions are defined by the overlapping apertures 42, 46 of the cam unit 43 and the guide unit 48 as shown in FIG. 4. As the cam unit 43 rotates relative to guide unit 48, the summation of force resulting from the geometry constraint and relative movement between the edges of respective apertures 42, 46, respective spindles 12 and respective bearings 50, causes the edges of respective apertures 42 and 46 to synchronously drive the spindles 12.

Figure 5:
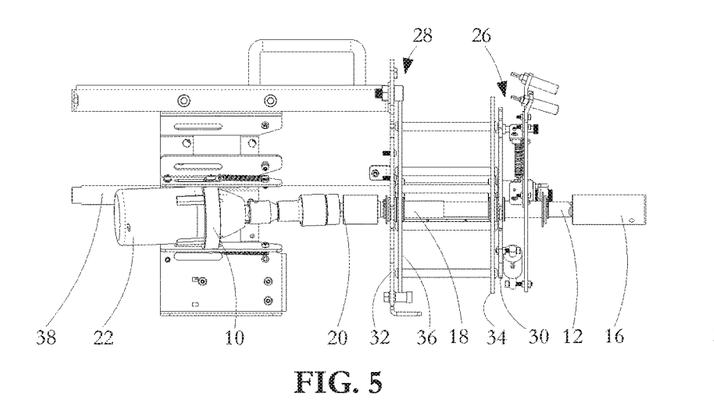
FIG. 5 is a side view of the threaded fastener engaging/disengaging tool of FIG. 1 showing a single spindle in non-retracted mode.
Figure 6:
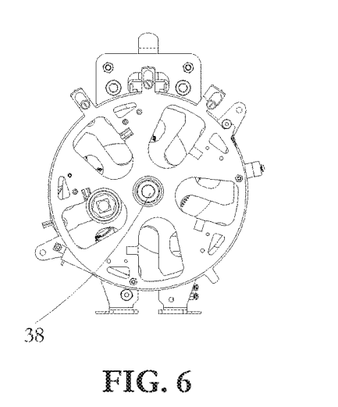
FIG. 6 is a front view corresponding to FIG. 5.

Each spindle 12 and respective connected parts such as socket 16, plate 60, universal joint 20, motor 22 and motor mounting 10 form a single drive train. Each drive train is loaded by a forward force (to the left as shown in FIG. 1) from respective springs 52. As will be described in more detail presently, when each socket is aligned with a respective wheel lug nut, and the tool is pushed toward the wheel, retraction of the parts in a respective drive train can occur in any of three situations. Firstly, when the socket 16 initially contacts a lug nut (not shown) in a hex misaligned position, secondly, after a lug nut slides into the hex hole in a respective socket and then the socket is blocked by the bottom of the lug nut or the surface of a fastener hole in the wheel, and thirdly, to allow room for a lug nut to be unscrewed. The retraction is accommodated by a combination of movements at the universal joints 20 and the motor mountings 10. Mounted to the front end of the shaft 38 and in parallel relationship to plate 30 is a blocking plate 54 on which contact sensors 56 are mounted. The blocking plate 54 is normally loaded by spring 58 into a blocking position as shown in FIG. 1. In this position, as also shown in FIGS. 5 and 6, a disc 60 mounted on a respective spindle 12 actuates a corresponding sensor 56 when that spindle retracts a predetermined distance and the disc 60 also abuts the blocking plate 54 to prevent that spindle 12 from further retraction. The blocking plate 54 can be rotatably driven by motor 62 in a clockwise direction about the axis of shaft 38 and against the bias of the spring 58 to an unblocking position shown in FIGS. 7, 8, 9A and 9B where just a single spindle drive train is illustrated for clarity. In this position, the spindle socket combination can be retracted further with the associated disc 60 permitted to pass through an aperture 64 in the blocking plate 54.

Figure 10:
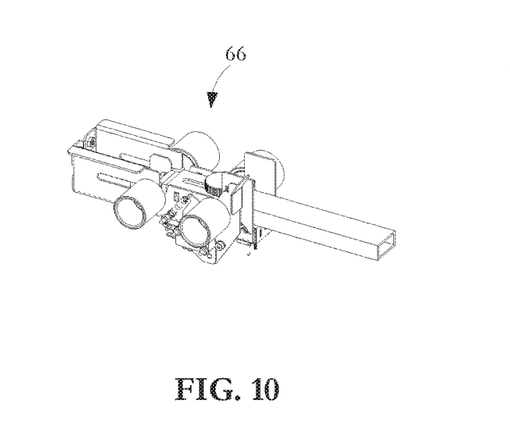
FIG. 10 is a perspective view showing an adjunct measuring jig for a tool according to an embodiment of the invention, the jig for measuring the spacing of wheel fasteners and for conditioning the tool according to the spacing.

When detaching a wheel from a vehicle wheel attachment member (not shown), the nature of the nut attachment pattern is first identified. As previously indicated, a five nut circular array is the exemplary embodiment described but the PCD may be any of a number of options. In one embodiment, a jig 66 illustrated in FIG. 10 is used for identifying the PCD of the target fastener members based on the principle that if the quantity of the fasteners is a fixed value, the spacing of adjacent fastener axes and PCD have a one-to-one correspondence. As shown more clearly in the exploded view of FIG. 11, the jig has a mounting unit 68 into which a calliper unit 70 can be clipped. The calliper unit 70 has a rectangular section inner member 72 to one side of which is mounted a cylinder 74 of a first size and to the other side of which is mounted a cylinder 76 of a second, different size. The inner member 72 nests within a hollow rectangular section outer member 80 to one side of which is mounted a cylinder 82 of the first size and to the other side of which is mounted a cylinder 84 of the second size. The nested inner and outer members 72, 80 can be slid relative to one another as indicated by arrow B to adjust the spacing of the cylinders 74, 76 from the cylinders 82, 84 respectively. A thumbscrew 86 has a threaded shank passing through a guide 103 on the outer member 80 and received in a threaded bore in the inner member 72 so that the relative positions of the inner and outer members can be fixed. The cylinders 74, 82, are mounted on one side and have a common inner diameter large enough to accommodate a lug nut with a particular size/form. The cylinders 76, 84 are mounted on the other side and have a common inner diameter large enough to accommodate a lug nut of different size/form. Cylinders 74, 76 are coaxially mounted to shaft 78 mounted to one end of inner member 72. The cylinders 82, 84 are mounted to shafts 88 which, in turn, are coaxially mounted to respective sides of the outer member 80 at a location spaced from shaft 78. Small lengths of the shafts 78, 88 are exposed between the nested members 72, 80 and the cylinders 74, 76, 82, 84.

Figure 11:
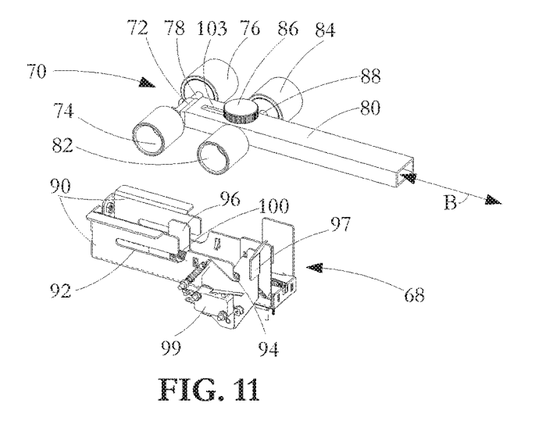
FIG. 11 is a perspective view showing a calliper unit and a mounting unit forming the jig of FIG. 10.
Figure 12:
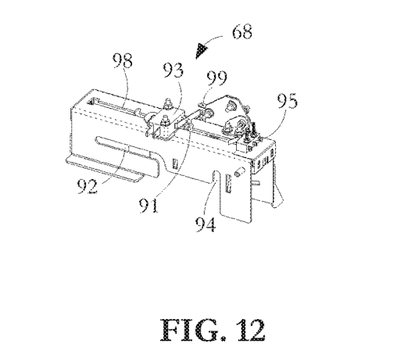
FIG. 12 is a perspective view from underneath showing the mounting unit of FIG. 11.
Figure 13:
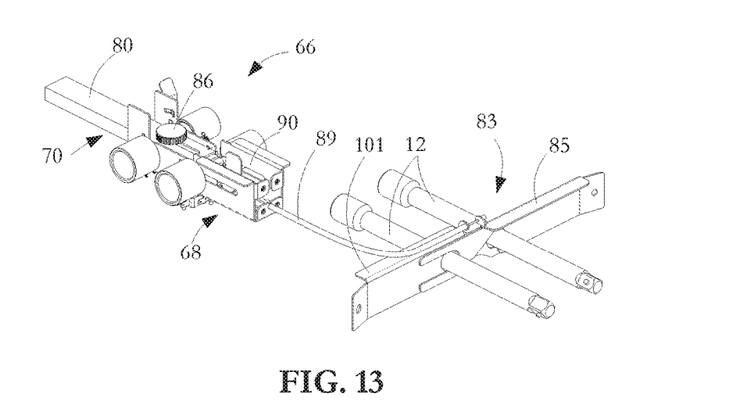
FIG. 13 is a perspective view showing the adjunct jig of FIG. 10 being used with tool spindles and spreader unit.
Figure 13A:
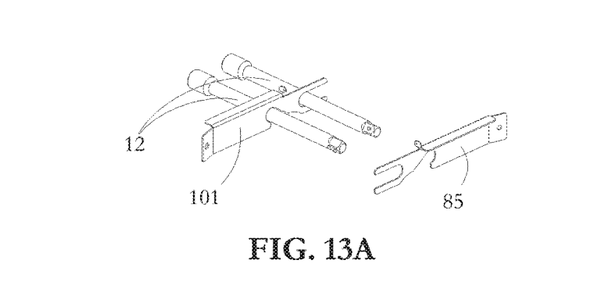
FIG. 13A is an exploded view of the spreader unit of FIG. 13.

In use, with the calliper unit 70 separated from the mounting unit 68 and the thumbscrew 86 released, the calliper unit 70 is taken to an attached target wheel and manually orientated and adjusted to insert suitable cylinders on one side onto a pair of adjacent lug nuts so as to cause the spacing of a cylinder pair 74, 82 (or 76, 84) on the calliper unit 70 to match the spacing of an adjacent pair of nuts on the attached wheel. The thumbscrew 86 is then tightened to fix the spacing of the cylinder pair 74, 82 (or 76, 84) and the calliper unit 70 is taken and inserted into the mounting unit 68. The U-section mounting unit 68 has upstanding flanges 90, each having a track 92 and a track 94 with the width of the tracks sized to receive the exposed lengths of shafts 78 and 88. The edges of tracks 92 on flanges 90 are aligned as are the edges of tracks 94. As shown in FIGS. 11 and 12, a follower unit 96 is mounted in a track 98 in the base of mounting unit 68 and is biased by tension spring 100 to the right as shown in FIG. 11. The act of clipping the calliper unit 70 into the mounting unit 68 drives the follower 96 against the action of tension spring 100 to a position representing the spacing of the cylinders 74, 82 (or 76, 84). As shown in FIG. 13A, in order to sense and feed back spacing of the spindles to the mounting unit 68, a spreader unit 83 is mounted between two adjacent spindles. The spreader unit 83 has plates 85, 101 each having a long track and an oblique track, with each oblique track having an arc bottom. The center lines of the long tracks extend in a longitudinal direction along the plates 85, 101. The center lines of the long tracks and the oblique tracks form a sharp included angle and the opening of the oblique track is closer to the respective long track than its bottom. One of the two adjacent spindles is put into the oblique track of plate 85 and the long track of plate 101, while the other spindle is put into the long track of plate 85 and the oblique track of plate 101. Plate 85 is connected by the wire of a Bowden cable 89 to a follower 91 (FIG. 12) which is loaded by a tension spring with the same direction of tension force as is applied to a follower 96. Plate 101 slides relative to plate 85 and is connected by the sleeve of the Bowden cable 89 to the fixed mounting unit 68. Plates 85, 101 and the long and oblique tracks formed in them are configured so that change of spacing between the adjacent spindles synchronously causes a corresponding change of distance between plate 85 and plate 101, whereby follower 91 moves toward follower 96. As shown in FIG. 9B, the four cylinders 102 are placed on each side of spreader unit 83 upon each spindle. Each cylinder 102 can slide relative to its associated spindle 12 with one end touching spreader unit 83 and other end touching bearing 50, whereby when each spindles retracts, spreader unit 83 is maintained perpendicular to the spindles and in the middle position between plate 34, 36.

Three sensors are mounted on the U-section mounting unit 68. A sensor 93, such as a snap-on sensor, is fixed to follower 96 and is triggered when the end of follower 91 catches up to follower 96, signifying that the spacing between adjacent spindles equals the spacing between shafts 78 and 88. If the spindles move closer to each other toward a standby home position, the second follower 91 will move in a direction away from follower 96. Otherwise, the spacing between the adjacent spindles is less than the spacing between shafts 78 and 88. A home sensor 95 fixed to the outer bottom surface of one end of the mounting unit 68 is triggered by the other end of follower 91 when the spindles 12 reach the home position. An in-place sensor 99 is mounted to an over center swingable lock 97 and is triggered by contact with cylinder 82 when the calliper unit 70 is inserted into the mounting unit 68 to show that the inserted calliper unit 70 is fully inserted.

In use, following adjustment of calliper unit 70 to match the wheel nut spacing, the calliper unit 70 is inserted into the mounting unit 68 by directing the exposed regions of shaft 78 into the track 92, and then pushing shaft 78 forward to cause it to contact and move follower 96 against the spring biased follower 96 and then pushing the other end down gently until the exposed regions of shafts 88 can be pushed down into the bottom of the track 94 where it is locked by the lock 97. When the calliper unit 70 is fully inserted and locked, the relative distance between follower 96 and track 94 represents the spacing between shafts 78 and 88, which, in turn, is equal to spacing between cylinders 74, 82 (or 76, 84).

Insertion of the calliper unit triggers adjustment of the spindle array to increase the diameter of the nominal cylindrical surface on which the spindles axes are located when in a nested 'home' position. Spindle spacing adjustment occurs by the cam unit 43 being rotated about the axis of shaft 38 and against the action of springs 44 driven by cable 47 linking linear motor 45 to one of the connecting rods 40. As the spindle axes spread, the plates of the spreader unit 83 are extended. Extension of the spreader plates is transmitted through cable 89 to cause the follower 91 to move towards the follower 96. When the followers contact, the drive to the adjustor units is halted. In an alternative embodiment, the jig 66 can be differently configured so that in the 'home' position, the spindles are fully spread and insertion of the calliper unit triggers adjustment of the spindle array to decrease the radius of the spindle end circle. In an alternative embodiment, the jig 66 is configured so that in the 'home' position, the spindles are at a fully spread position or are between fully spread and fully nested positions, and insertion of the calliper unit triggers pre-determined adjustment of the spindle array to decrease or increase the diameter of the notional cylindrical surface on which the spindle surfaces are located.

Signals generated at the three sensors on the mounting unit 68 are sent to control unit 106 which outputs power to control the linear motor 45 to drive the cam unit 43 to increase or decrease the spacing of spindles 12 by rotation of the cam unit 43 about the axis of shaft 38. As the cam unit 43 is rotated in a clockwise direction as shown in FIG. 1, the axes of the parallel spindles 12 are caused by the relationship between the arcuate apertures 42 and the apertures 46 to be driven apart while a circular disposition of the spindle axes is retained. Conversely, when the cam unit 43 is rotated in an anticlockwise direction, the axes of the spindles 12 are driven towards one another, again with a circular disposition being retained. The spindle spacing is adjusted until the sensor 93 is triggered, this representing the spacing of spindles being equal to spacing between shafts 78, 88, which, in turn, is equal to the spacing of wheel lug nuts on the target wheel. Although the guide unit 48 of FIG. 3 has straight sided recesses 46 that extend radially in a direction passing through the axis of shaft 38, the recesses can be alternatively configured so that they are curved and/or not aligned with the shaft axis, provided that relative rotation of the recesses 46 and apertures 42 cause the spindles 12 to be driven in and out to change the radius of the circular array. Similarly, the arcuate apertures on the cam unit can be differently shaped so long as the radius change results from the relative rotation.

Figure 25:
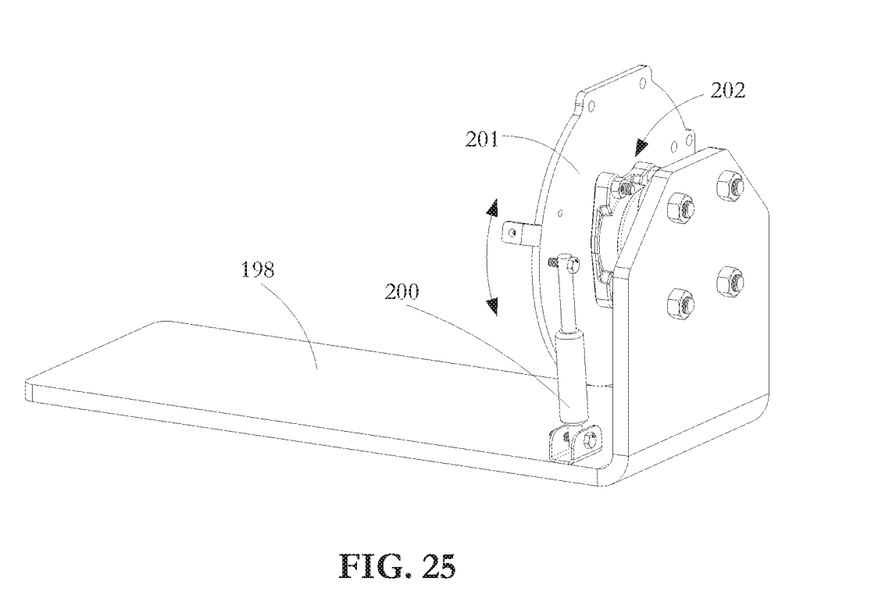
FIG. 25 is perspective view of a tool base for supporting a tool according to an embodiment of the invention, the base including a mechanism for rotating a tool spindle assembly.

In order to align each spindle with respective wheel fastener such as a lug nut, in addition to the spacing adjustment of the spindles, a tool orientation procedure is also performed to align the center axes of the tool and the wheel, and to align azimuths of the array of the spindles and the lug nut. This is done manually if the tool is of manageable weight. For a heavier tool and/or repeated action, the tool frame is bolted to a powered or manually adjustable base 198 (FIG. 25) or a robotic arm permitting full translational adjustment (left/right, up/down and fore/aft) and permitting full angular adjustment (roll, pitch, yaw). Appropriate translational and angular drives are applied to the base under the control of an electromechanical control unit/system, or by an operator who watches as the base is adjusted to manoeuvre the tool into position. An example of a suitable robotic arm for use with the tool of the invention is the KR QUANTEC press available from KUKA Deutschland GmbH, Zugspitzstraße 140, 86165 Augsburg, Germany and illustrated at https://www.kuka.com/en-ch/products/robotics-systems/industrial-robots/kr-quantec-press which is hereby incorporated by specific reference. Alternatively, base or robotic arm adjustments are made automatically using a system with coordinated machine vision and navigation capabilities which can include cameras, position system such as GPS, electronic communication systems such as wireless or wired network, control system and other sensors/actuators. In such a system, a camera or cameras (not shown) monitors the positions and orientation of the wheel (or wheel attachment member), the stud positions, etc., and simultaneously monitors the position of the spindle ends. While continuously monitoring, the control unit moves the base to bring the spindle end positions and the studs/lug nuts into coincidence. As an alternative or in addition to tool movement, some translational and angular adjustments can be made at the wheel (or wheel attachment member). In the arrangement shown in FIG. 25, a tool bed 198 is mounted on a base (not shown) to enable the tool to be moved in any or all of the 3 translational movements and 3 angular movements. Roll is also achieved locally at the spindles using a linear motor 200 connecting the tool bed 198 to a disc 201 and bearing 202 assembly mounted on the back of the tool for rotation about central shaft 38. Turning the disc and bearing assembly results in a corresponding turning of the circle of spindle ends while maintaining the radius of that circle.

Following the spindle spacing adjustment and the tool orientation procedure, a 'hex' alignment is performed to bring flats on the inner hexagonal prism of each socket 16 into alignment with flats on the exterior hexagonal prism of the corresponding nut (not shown) to permit the hex nut to slide into the hexagonal prism hole in the socket. If this is not done, the misaligned hexagonal prism surface on the nut and the socket will prevent an insertion movement, even if their axes are aligned. To effect the hex alignment, the tool is pushed forward towards the attached wheel. Once again, the tool can be manually manoeuvered or moved by means of powered self-moving base 198, optionally with machine vision control. When socket to lug nut (or stud) contact is made, a particular socket and its corresponding lug nut may be hex aligned, in which case the socket 16 keeps moving forward and slides onto the corresponding nut. In other cases, an initially axis aligned spindle is hex misaligned, in which case movement of the misaligned socket is blocked by the corresponding nut. As the tool frame moves forward, the blocked socket and respective drive train retracts relative to the tool frame and against the action of springs 52. When the blocked retracting drive train reaches a limit position determined by contact between disk 60 and blocking plate 54 further retraction is prevented. At the same time, associated contact sensor 56 on plate 54 is triggered. In response to any one of the sensors 56 being triggered, motors 22 connected to the spindles 12 are switched to a low torque operating mode for a predetermined minimum time. As the spindles 12 are turned, any misaligned socket reaches a position where its interior flats become aligned with exterior flats of the associated lug nut at which point the socket jumps forward under the force from spring 52 and slides onto the corresponding nut. With insufficient torque to overcome the nut fixture to the wheel attachment member, the low torque drive stalls when the nut slides into the socket. At this time, discs 60 jump forward with respective drive trains, so contacts between disks 60 and plate 54 are disengaged, the tool frame is free to move forward again with all sockets, until subsequently all the socket are blocked by the bottom of a corresponding nut or by the surface of a respective fastener hole on the wheel. At this point, further movement of the drive trains are blocked and again retract relative to the tool frame until discs 60 again contact plate 54, at which point the tool frame is blocked and stopped again, with all contact sensors 56 triggered.

Following the predetermined minimum time after any of the sensors 56 is triggered, with the signal showing that all sensors 56 are triggered, the control unit 106 switches the tool to high torque mode. The actions in sequence include: outputting a signal to fix and lock the position and attitude of the tool frame; rotating the blocking plate 54 from the blocking to an unblocking condition; and then switching each motor 22 in a determined sequence from a low torque to a high torque mode. Before moving plate 54 to the unblocking condition, the following alignment and positioning conditions will have been fulfilled:

1: Center axes alignment: wheel center axis aligned with center shaft 38 of the tool.

2: Azimuth alignment: Axis of one spindle, is located on the plane consisting of wheel center axis and axis of one lug nut, said spindle and said lug nut are on the same side of wheel center axis.

3: Socket axes alignment: Each socket axis aligned with axis of respective lug nut.

4: Hex alignment: Each socket "Hex" aligned with respective lug nut.

5: Inserted: All sockets slid onto corresponding nuts

6: Frame locked: Frame of tool locked against any further movement and attitude change Among the above conditions, the sequence of fulfilling conditions 1, 2, 3, 4 is flexible. Condition 5 is effected after fulfilling conditions 1, 2, 3, 4 and condition 5 is fulfilled before condition 6. The control logic and process described above can be changed based on the above condition sequence.

Figure 7:
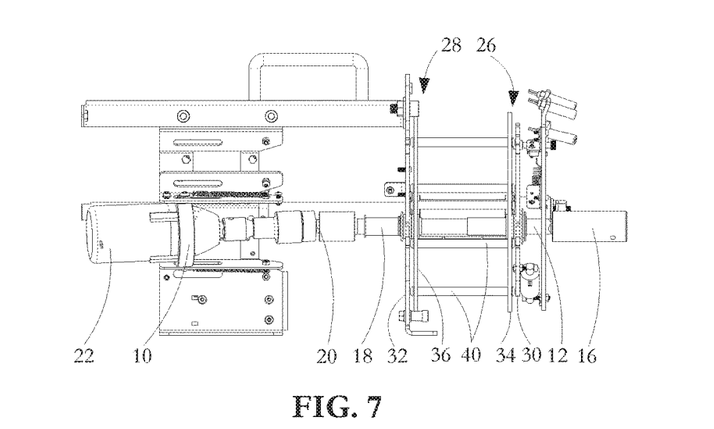
FIG. 7 is a side view corresponding to FIG. 5 but showing the single spindle in fully retracted mode.
Figure 8:
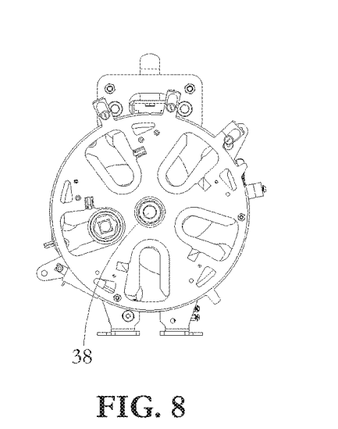
FIG. 8 is a front view corresponding to FIG. 7.
Figure 9A:
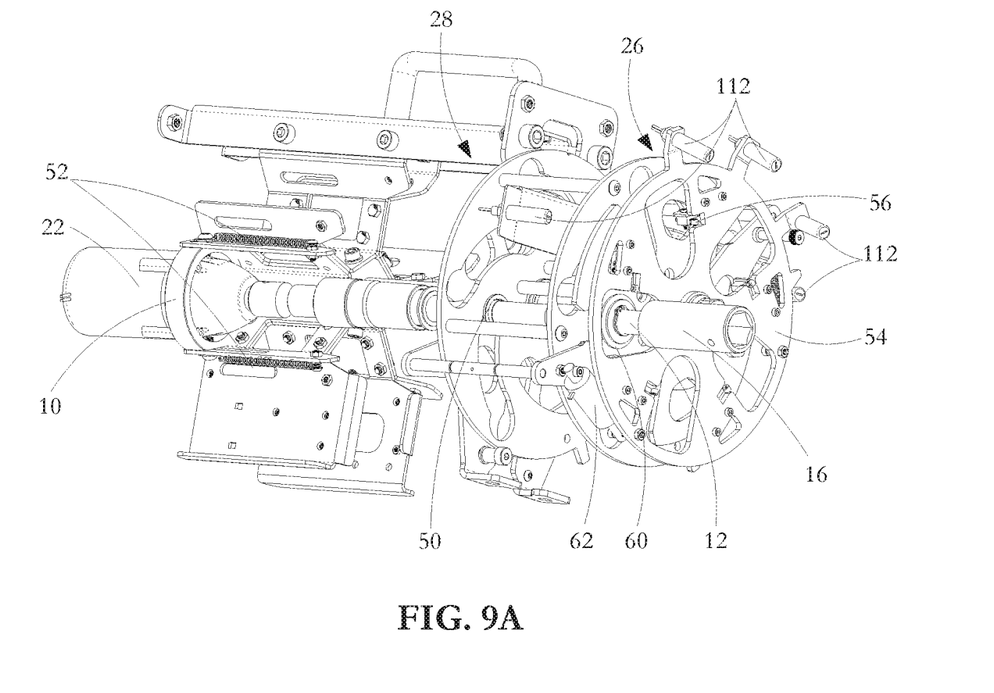
FIG. 9A is a partial perspective view from the other side of the threaded fastener engaging/disengaging tool of FIG. 1 but showing a single spindle in fully retracted mode.
Figure 9B:
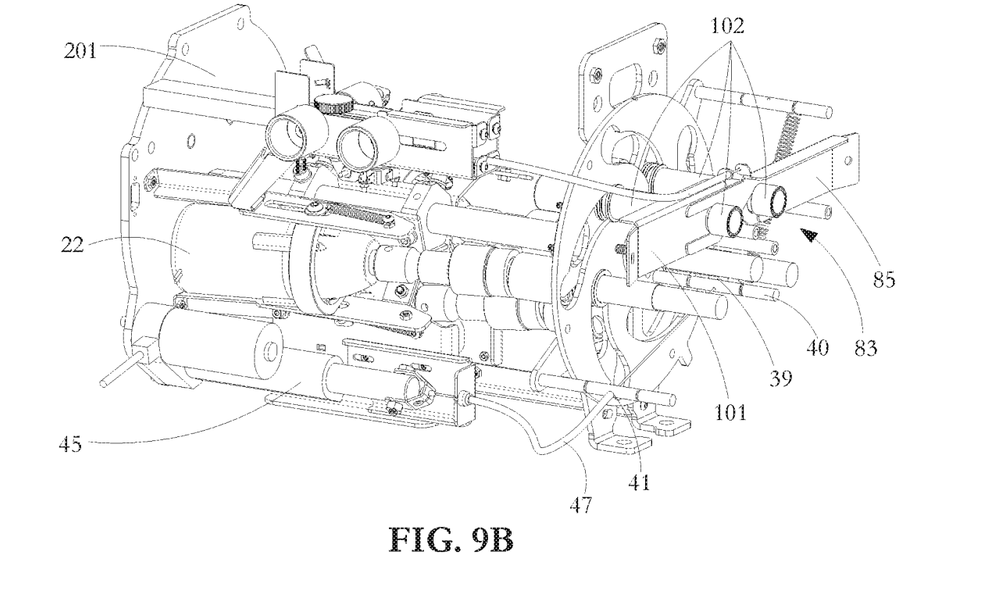
FIG. 9B is a partial perspective view similar to FIG. 9A but also showing a mechanism for operating adjustor units.

The blocking plate 54 is unlocked by motor 62 driving it from the position shown in FIG. 6 to the position shown in FIGS. 8 and 9A. This allows discs 60 mounted on the spindles 12 to pass back through respective apertures 64 when the drive trains are moving backwards to the right as shown in FIGS. 5 and 7 in the course of a lug nut moving backward during removal.

In an alternative embodiment for generating drive to the spindles to match the spacing at the lug nuts, the attachment/detachment apparatus has a machine vision arrangement. As shown in FIG. 1, the machine vision arrangement includes line lasers 112 attached to the apparatus. The line lasers are used in the axial alignment and orientation alignment processes, with a the laser on top of plate 54 used to show the center vertical plane of the tool passing axis of center shaft 38, the other pair of upper lasers on plate 54 being used to show the moving track line of the two highest sockets and the two lower lasers being used to show the position of the plane occupied by the axes of the two spindles where spreader unit 83 is installed on. In geometrical terms, the two intersection points of lines from the two lower lasers and the said pair of higher lasers on plate 54 represent the location of the axes of the two highest sockets.

Appropriate control logic in control unit 106 is used to make the initial spindle alignment as previously described. Image analysis and distance sensors may be used to monitor the alignment status of the wheel. Based on vehicle dimensional and related specifications, machine vision units monitor the top and bottom of the wheel to check whether the vertical alignment is correct and monitor the front and back of the wheel to check whether its lateral alignment is correct in comparison with the specifications. The control logic can be used with machine vision to adjust the orientation of the apparatus by driving adjustment motors for adjusting the orientation of a tool support bracket such as that shown in FIG. 25. Image analysis may also be used to identify the size and form of the wheel nuts to ensure that the correct socket is deployed. Finally, image analysis may be used to identify the orientation of the lug nuts exterior surface, such as hexagonal prism orientation. The image analysis and distance data is used by the control unit to provide both tool position and attitude control and optionally to control motors 22 to accurately control spindle rotation angle so that the orientation of hexagonal prism hole inner flats in each socket is adjusted in advance, whereby they lock straight into place without the need for the low torque phase previously described.

In a typical machine vision sequence under the control of suitable computer algorithm, the tool is moved toward the fasteners with camera, distance sensor and control unit 106 continuously monitoring the image to analyze relative distances and orientation between the tool and the target fasteners members. Azimuth alignment of the tool and spacing of the spindles are also adjusted, until the spindles and the respective fastener members are axially aligned. Over the same time, when the tool is close enough to the target fasteners/studs, the camera and control circuit is set to analyze the orientation of each hex lug (or other fastener head shape) and the motors are driven to rotate the spindles so that each socket hex is aligned with corresponding target fastener/stud.

Figure 14:
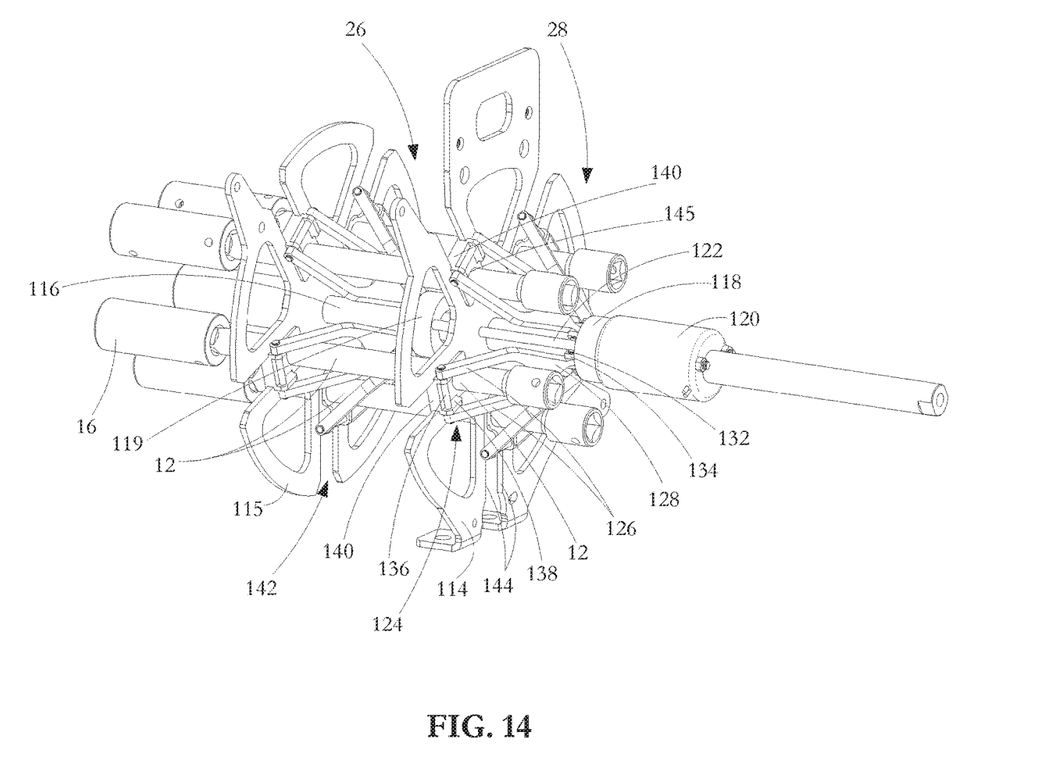
FIG. 14 is a perspective view from one side and above of a threaded fastener engaging/disengaging tool according to another embodiment of the invention.

Referring to FIG. 14, a different form of adjustor mechanism is illustrated. As in the embodiment of FIG. 1, spindles 12 are mounted with parallel longitudinal axes by engagement at spaced adjustor units 26, 28. The spindles are rotatable about their longitudinal axes. The axes of spindles are circular arrayed with spindle axes being equally spaced and extending along a notional cylindrical surface. Spindle front ends are formed with square or other shaped drives or sockets and the rear ends of the spindles are formed with square or other shaped sockets for coupling to dedicated motors such as motors 22. As in the FIG. 1 embodiment, sockets 16 mountable on the spindle drives are adapted to hold and rotate threaded fasteners such as lug nuts. The adjustor units 26, 28 each includes a plate 114, 115 fixed to the tool frame, the plates being parallel to one another. Fixed at the center of the plates and extending between them is a center shaft 116 on which are mounted hubs 118, 119 that are reciprocably slidably driven along the shaft by operation of a linear motor 120. The hubs 118, 119 are connected by coupling rods 122 so that they move synchronously along center shaft 116. In the embodiment of FIG. 14, the shaft 116 between plates 114, 115 has a smaller diameter portion, while in an alternative embodiment, the shaft 116 may be of uniform diameter with plate 114 being welded to the shaft 116. The linear motor 120 and hub 118 slide on a rear section of the shaft 116 and the hub 119 slides on a front section of the shaft extending between the plates 114, 115. Mounted to each hub are five push-pull linkages 124. Each linkage 124 is of bifurcated form, having parallel legs 126 integral with a head end 128, and with a space between the legs 126 accommodating an associated one of slide members 140.

The head end 128 is mounted between respective flanges 134 projecting from the hub 118. A bore on head end 128 is coaxial with a rod 132 fixed upon flanges 134 to permit angular movement of the linkage 124 relative to hub 118 about the axis of rod 132. At the tail end of each linkage 124, a rod 136 extending between legs 126 is mounted between flanges 138 projecting from a respective slide member 140 to permit angular movement of the linkage 124 about the axis of rod 136. Each of the plates 114, 115 is formed with five inwardly extending recesses 142 circularly arrayed about the axis of center shaft 116, the recesses 142 in plate 114 being aligned in a direction parallel to the axis of center shaft 116 with respective recesses of plate 115. In the embodiment of FIG. 14, each recess 142 has straight edge sections 144 that are parallel and face each other although the edge sections can be differently configured. Respective slide members 140 have edges contoured to engage respective edge sections 144 so that the slide members 140 can slide inwardly and outwardly along the recesses with the sliding movement having a radial component. The spindles 12 are received in bores 145 in associated slide members 140.

When detaching a wheel from a vehicle wheel attachment member, the nature of the size and form of the lug nuts and their attachment pattern is first identified by one of the methods described with respect to the embodiment of FIG. 1. Subsequently, to adjust the size of the notional cylindrical surface on which the parallel spindle axes are located, or in other words to adjust the spacing of the spindles, an output from the control unit is taken as an input to the linear motor 120 to move the connected hubs 118, 119 along the center shaft 116, either to the left to increase the spread of the spindles 12 or to the right to reduce the spread. As the hubs 118, 119 move to the left, geometry constraint and relative movement between plates 114, 115 and linkages 124 drive the slide members 140 to move synchronously along the edge sections 114 of recesses 142. In this way, the spacing of the spindles is increased while keeping their axes parallel, equally spaced and still on a notional cylindrical surface around center axis of the tool. As the hubs are moved to the right, a reverse movement occurs. Once again, the spindle spacing is adjusted until the spacing is equal to spacing of target fasteners or until monitored machine vision relationships are satisfied.

Referring to FIGS. 15 to 18, a further form of adjustor mechanism is illustrated. As in the embodiment of FIG. 1, spindles 12 are mounted with their longitudinal axis extending parallel to one another by their engagement at spaced adjustor units 26, 28. Spindle front ends are formed with shaped drives or sockets and the rear ends of the spindles are formed with shaped drives or sockets for engagement with dedicated motor drives of the form shown in FIG. 1. Sockets 16 mountable on the spindle front ends are adapted to hold threaded fasteners such as lug nuts. The spindle axes are arranged in a circular array with spindle axes located on a notional cylindrical surface and equally spaced with the spindles 12 being rotatable about their longitudinal axes. The adjustor unit 26, 28 include parallel plates 146, 147 which are fixed to a tool frame (not shown). Mounted at the center of the plates 146, 147 and extending between them is a shaft 148 on which are mounted two spaced hubs 150 that are rotatably driven about the shaft axis by operation of actuator 152. The hubs 150 are interconnected by coupling rods 154 so that the hubs 150 rotate synchronously. Mounted to each of the hubs 150 is a series of linkage members 156, the linkage members being circularly arrayed about the axis of central shaft 148. Each linkage member 156 is hinged at one end to one of the hubs 150 for reciprocal angular movement in a plane parallel to the plates 146, 147. At the distal end, each linkage member 156 is mounted to a spindle supporting bearing housing 158, each spindle being received by a bearing (not shown) inside of respective bearing housing 158 to permit individual rotation and axial movement. Each spindle is coaxial with an exterior round groove on respective bearing housing 158. Each of the plates 146, 147 is formed with five inwardly extending recesses 160 circularly arrayed about the axis of central shaft 148, the recesses 160 in plate 146 being aligned in a direction parallel to the axis of shaft 148 with respective recesses 160 of plate 147. Each recess 160 has straight edge sections that are parallel and face each other. Exterior round groove of each bearing housing 158 engages respective straight edge sections of the recesses 160 so that the bearing housing 158 can slide inwardly and outwardly along the recesses, the sliding movement having a radial component. The actuator 152 is connected at one end to a connecting rod 153 extending between plates 146, 147, and at its other end to one of the coupling rods 154 and is operable to drive the linkage members 156 between limit positions shown respectively in FIGS. 16 and 17.

Figure 15:
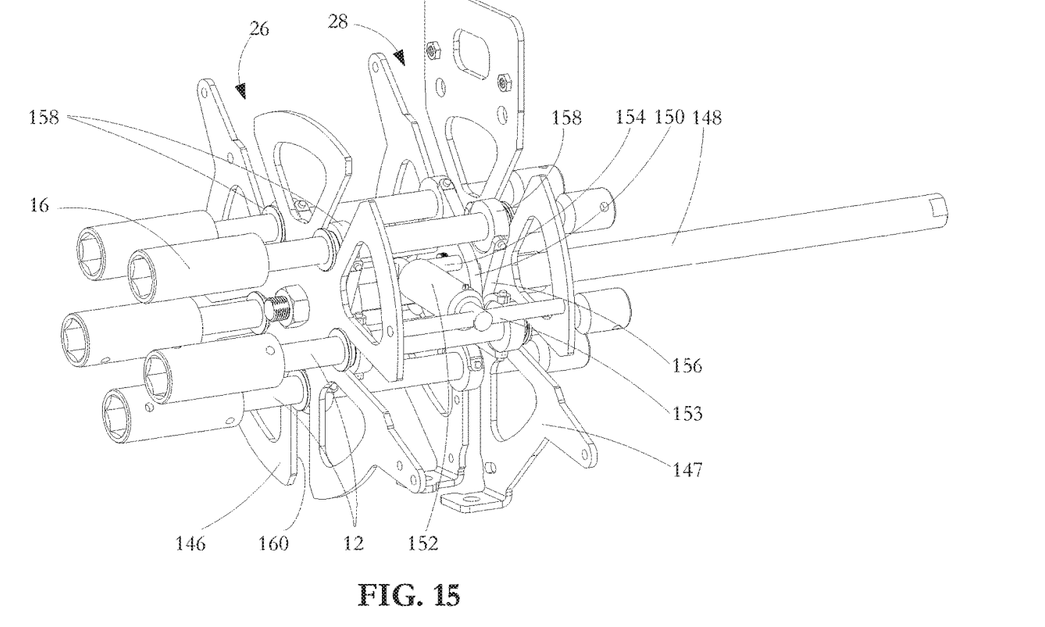
FIG. 15 is a perspective view from one side and above of a threaded fastener engaging/disengaging tool according to a further embodiment of the invention.
Figure 16:
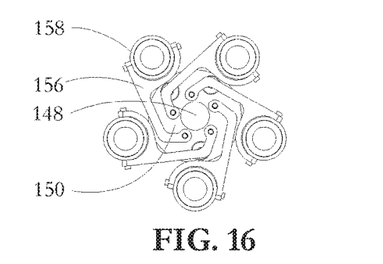
FIG. 16 is an end section view of a hub and linkage members forming part of the tool of FIG. 15, the spindles and linkage members being shown in a nested condition.
Figure 17:
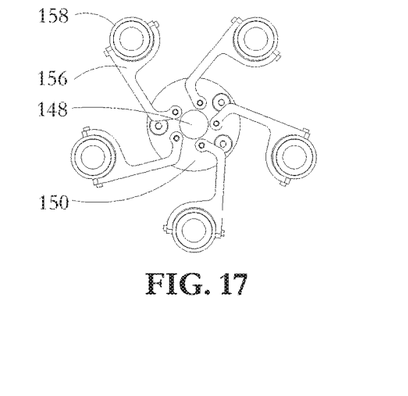
FIG. 17 is an end section view of the hub and linkage members of FIG. 15, the linkage members being shown in an extended condition.
Figure 18:
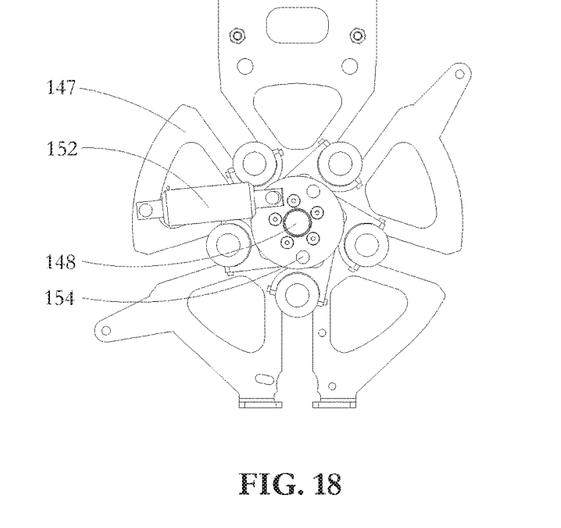
FIG. 18 is an end section view of an adjustment mechanism forming part of the tool of FIG. 15, the figure showing linkage members in the nested condition.

When detaching or attaching a wheel from or to a vehicle wheel attachment member with the apparatus of FIG. 15, the size and form of the lug nuts and their attachment pattern are first identified by one of the methods described with respect to the embodiment of FIG. 1. Subsequently, to perform spindle spacing adjustment for an initial axial alignment, an electrical control unit controls the rotary actuator 152 to rotate the connected hubs 150 about the shaft 148, either in one direction to increase the spread of the spindles 12 or in the opposite direction to reduce the spread. As shown in FIGS. 16 and 17, as the hubs 150 rotate in a clockwise direction, the outer ends of the linkage members 156 also tend to rotate, with the bearing housings 158 and edges of recesses 160 constraining the bearing housings 158 to move outwardly as the bearings slide along the edges of the recesses. The coordinated movement of the bearing housings 158 causes the spindles to be driven radially outwards away from the central shaft 148 so as increase the spacing of the spindles 12 while keeping their axes parallel and keeping the spindle axes in a circular arrangement. As the hubs 150 move in an anticlockwise direction when the actuator motor 152 is reversed, movement of reverse direction occurs. Once again, the spindle spacing is adjusted until the spacing is equal to spacing of target fasteners or until monitored machine vision relationships are satisfied.

Figure 24:
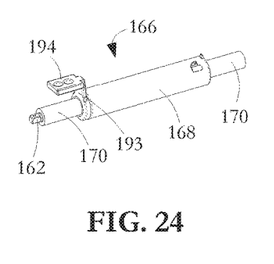
FIG. 24 is a perspective view of spindle drive unit for the embodiment of FIG. 19, the drive unit showing an attached reaction bar.

Referring to FIGS. 19 to 24, in another embodiment of the invention, the spindles 162 are output shafts of respective associated driving units 166. As in the previous embodiments, adjustor units 26, 28 form parts of an adjustment mechanism for collectively altering the positions of the spindle ends between circular arrays having different radii. The front ends of spindles 162 are formed with drives, with sockets 16 mountable on the drives adapted to hold threaded fasteners such as lug nuts. The spindle axes are arranged in a circular array or equivalently the spindle axes are located on a notional cylindrical surface and are equally spaced. The spindles are rotatable about their longitudinal axes driven by motors in driving units 166 which optionally have torque control capability. As shown in FIG. 24, the housing of each motor unit 166 has a central barrel section 168 and integral hollow shafts 170 at both ends, the spindles 162 being mounted inside respective hollow shafts 170 on the front end of the barrel sections 168.

Figures 19, 20, 21, 22:
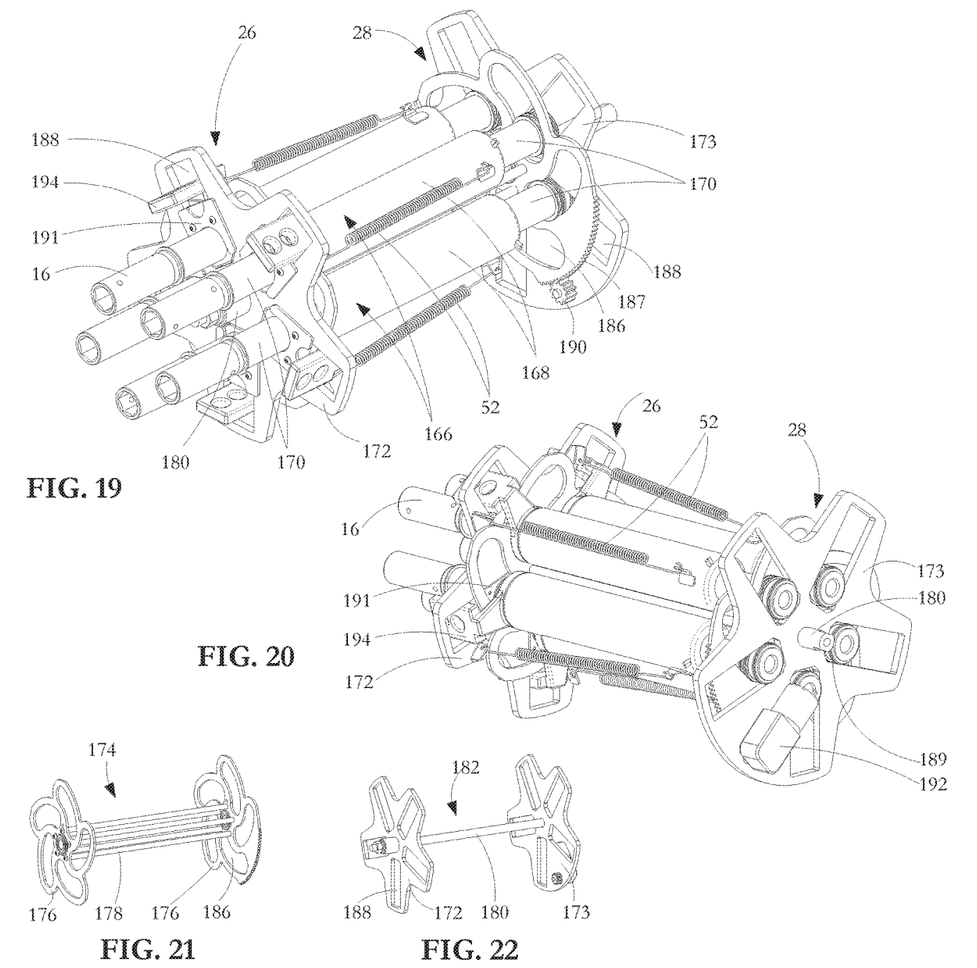
FIG. 19 is a perspective view from one side and above of a threaded fastener engaging/disengaging tool according to yet another embodiment of the invention.
FIG. 20 is a perspective view corresponding to FIG. 19 but showing the tool from above and the other side.
FIG. 21 is a perspective view of a cam unit of the embodiment of FIG. 19.
FIG. 22 is a perspective view of a guide unit of the embodiment of FIG. 19.
Figure 23:
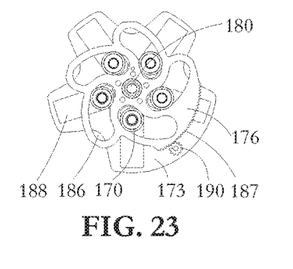
FIG. 23 is an end view showing the assembled cam and guide units of FIGS. 21 and 22.

In the adjustor units 26, 28, a cam unit 174 shown in detail view in FIG. 21 has a pair of spaced parallel plates 176 fixed relative to each other by connecting rods 178 or other type of connection. The plates 176 have arcuate apertures 186 circularly arrayed about the axis of shaft 180, and corresponding apertures 186 on the spaced plates 176 being aligned parallel to the axis of center shaft 180. The cam unit 174 is mounted for rotation about shaft 180. A guide unit 182 shown in detail view in FIG. 22 has a second pair of spaced parallel plates 172, 173 which are, in use, fixed to a tool frame. The plates 172, 173 have generally radially extending apertures 188 circularly arrayed about the shaft axis, and corresponding apertures 188 in the plates 172, 173 are aligned along axes parallel to the axis of shaft 180. The cam unit 174 is mounted between the guide unit plates 172, 173 with the shaft 180 and the coupling rods 178 located radially inwards of the drive units 166. Rear end sleeves 170 are received in bearings 189 and front end sleeves 170 are received in slider units 191. One of the plates 185 has a toothed edge portion 187 which engages teeth of a pinion gear 190 mounted on the rear plate 173. Actuator motor 192 is operable to rotate the pinion gear 190 about its mounting axis so as to rotate the cam unit 174 about the axis of shaft 180. With the same operating principle as the embodiment of FIG. 1, as the cam unit 174 rotates in a clockwise direction as shown in FIG. 19, geometry constraint and relative movement between apertures 186, 188 drive the drive units 166 apart with respective spindles 162 and hollow shafts 170 while a circular disposition of the spindle axes is retained. As the cam unit 174 is rotated in an anticlockwise direction, the drive units 166 and spindles 162 mounted within them are driven towards one another with a circular disposition of the spindle axes maintained.

Each drive unit 166 is biased by springs 52 to provide a small forward force (to the left as shown in FIGS. 19 and 20), and hollow shafts 170 slide in the bearings 189 or slider units 191, permitting the drive units 166 to retract rearwardly relative to the frame, to provide room for retraction of sockets when necessary. Within each barrel section 168, the driving unit suitably includes a motor and a reducer for gearing down the motor output to increase torque. Optionally, each driving unit 166 can be equipped with either a control device for controlling the output torque of the spindle 162, or has motor with inherent torque control. The driving unit can also incorporate an impact mechanism with provision for disabling the impact mechanism if the tool is to be used in torque limiting fastener attachment/detachment mode. The hollow shafts 170 are integral with barrel section 168 within which the motor, reducer and related components are housed. As an alternative to the driving unit 166 retracting synchronously as the spindle retracts, the drive unit 166 and spindle 162 can be decoupled to the extent that the spindle 162 is retractable in the axial direction and the motor unit 166 is either slidable or non-slidable in the axial direction.

Reaction bars 193, each having one end clamped at the front drive end of a respective barrel 168, are used for preventing motor units from rotation about their longitudinal axes and, when necessary, providing reaction torque during wheel attachment/detachment. Short bars 194 with suitable axial length on the other elbow shaped ends of the reaction bars 193 are slidably received in apertures 188. Each reaction bar 193 is fixed to a respective barrel 168, so that as the barrels 168 move, respective short bars 194 move synchronously relative to the edges of aperture 188. The relative movement between short bars 194 and edge of aperture 188 can be in the axial or radial direction relative to center shaft 180, or any combination of the two directions. When subject to torque output on the spindles 162, the driving units will be applied a reaction torque reversely rotating respective driving units with the reaction bars. In this way, corresponding short bars 194 are pushed against corresponding edges of apertures 188 generating a reaction force, the reaction force generating a torque to respective drive unit through the respective reaction bar, the torque being equal and reverse to the reaction torque applied to respective drive units, whereby the summation of torque applied to respective drive unit 166 is zero, so that respective drive units 166 can be balanced. To accommodate retraction of the output shafts/spindles 162, the sleeves 170 are also free to move over a limited distance parallel to the central axis of the tool. The hollow shaft 170 on the rear end of drive unit can be of a different shape, such as but not limited to a solid bar. The exterior shape of the front hollow shaft 170, can also be shaped differently, such as, but not limited to a rectangular surface or an elliptical surface.

In each of the described embodiments, the spindles are normally of circular cross-section with front ends each formed with a drive of convenient size and form to provide a standard or non-standard interface for use in engaging and driving any of a variety of fastener socket shapes and sizes that are used to hold and drive fasteners such as lug nuts. Sockets to be fitted to the front end of the spindles are selected according to the type of target fasteners or other task requirement and are installed upon the tool at an operation site such as a repair shop. Common, but not exclusive, examples of fasteners for use in attaching wheels on a vehicle, are M12 nuts or bolts with 19 hex head, M14 nuts or bolts with 21 mm hex head, M12 or M14 socket head cap bolt and M12 or M14 torx nut or torx socket cap head bolt.

In the illustrated embodiments, five fasteners per circular array are shown but are merely exemplary. In practical applications, such as vehicles for road and off-road use, common circular patterns of fasteners for a wheel can be 3, 4, 5, 6 or 8 fasteners. For large applications such as trucks fasteners per wheel can be up to and greater than 10.

In the several embodiments, the movable plates of the cam units and the fixed plates of the guide units are shown coupled to one another by connecting rods such as 30, 32, 34 and 36. The plates can be connected by other means such as a welded bars, tapped cylinder tube or both ends threaded and stepped shaft, etc.

In the illustrated embodiments, the spindles 12, 162 are shown evenly arrayed with their axes around a central shaft. It will be appreciated that in another embodiment of the invention, there could be possibly fewer or more spindles than the number of target fasteners, if the spacing of adjacent spindles has enough range of adjustment. For example, for a symmetrical circular array of six fasteners, the tool can have three spindles with spindle axes equally arranged on a cylindrical surface. In use, three of the fasteners are attached or detached and then the tool is rotated about its center shaft 60 degrees so that the spindles are rotated as a group to bring them into alignment with the remaining three fasteners, at which point the remaining three fasteners are attached or detached. Similarly, a tool with five spindles usually used for automobiles can be used with a ten nut array which often characterizes trucks. The reverse is also possible: for example, a ten spindle tool can be used on a five nuts vehicle by detaching five evenly spaced sockets from the tool spindles. In another embodiment, the tool has a reduced number of parallel spindles. When using such an embodiment, the spindles are used initially to work on some of the fasteners. Subsequently the tool is suitably rotated, and the spindles are used to work on the remaining fasteners.

In the illustrated embodiments, the spindles are adjusted synchronously to change the radius of the circular array. Although less convenient and requiring more complex control, it will be understood that the positions of the parallel spindles can be adjusted in a sequential or other manner.

Other variations and modifications will be apparent to those skilled in the art and the embodiments of the invention described and illustrated are not intended to be limiting. The principles of the invention contemplate many alternatives having advantages and properties evident in the exemplary embodiments.

What is claimed is:

1. Apparatus for manipulating a plurality of first screw fasteners screw engageable with respective ones of a plurality of second screw fasteners integral with a first base member, the apparatus comprising a frame and a plurality of elongate parallel spindles, the spindle axes located on, and equally spaced around, a notional cylindrical surface, the spindles rotatable about respective longitudinal axes thereof, a plurality of motors respectively connected to the plurality of spindles for axially rotating the spindles independently of one another, a drive mechanism for driving the spindles independently of one another in a first direction parallel to the longitudinal axes of the spindles, the spindles mounted to the frame so as to permit retraction, independently of one another, of any one of the spindles in a second direction opposite to the first direction, and an adjustment mechanism collectively to change positions of the spindle axes between positions on a notional cylindrical surface having a first radius and a notional cylindrical surface having a second radius.

2. The apparatus as claimed in claim 1, wherein the adjustment mechanism includes an adjustor unit having first and second members, the first member being rotatable relative to the second member, the first member having a first aperture and the second member having a second aperture, the first aperture at least partially overlapping the second aperture, and one of the spindles received in the overlapping apertures, the apertures configured so that relative rotation of the first and second members causes movement of said spindle having a radial component relative to said notional cylindrical surfaces.

3. The apparatus as claimed in claim 2, wherein the said spindle is mounted at a bearing, the bearing having a bearing interface with boundaries of said overlapping apertures.

4. The apparatus as claimed in claim 1, wherein the adjustment mechanism includes an adjustor unit having first and second members, the first member being rotatable relative to the second member, and a crank member having one end attached to and angularly rotatable relative to the second member, the crank member having a bore at its other end to receive one of the spindles, whereby relative rotation between the first and second members causes movement of the other end of the crank and the spindle, such movement having a radial component relative to said notional cylindrical surfaces.

5. The apparatus claimed claim 1, wherein the adjustment mechanism includes an adjustment unit having first and second members interconnected to permit relative movement of the first and second members along a first axis, and a linkage having a first linkage part mounted for angular rotation at the first member and a second linkage part mounted for angular rotation at the second member, one of the spindles mounted at the second linkage part, whereby said relative movement of the first and second members along the first axis causes movement of the second linkage part and said spindle relative to the second member along an axis having a radial component relative to said notional cylindrical surfaces.

6. The apparatus as claimed in claim 1, wherein the spindles are mounted to the respective motors by respective flexible links to accommodate said changed positions of the spindle axes.

7. The apparatus as claimed in claim 6, wherein the flexible links includes a plurality of universal joints coupling respective motors to respective spindles, the motors being mounted to permit angular movement whereby angular movement of the motors and at the universal joints together accommodate said changed positions of the spindle axes.

8. The apparatus as claimed in claim 2 having a plurality of said adjustor units, the adjustor units being spaced from one another and the spindles extending through the spaced adjustor units.

9. The apparatus as claimed in claim 1, further comprising a measuring unit for measuring a first spacing between a pair of the second screw fasteners, and an input from the measuring unit to set a second spacing between axes of a corresponding pair of the spindles, the second spacing being equal to the first spacing.

10. The apparatus as claimed in claim 1, further comprising an image acquisition and machine vision sub-system for measuring the spacing of a pair of the second screw fasteners from one another and a control circuit having an input from the image acquisition and machine vision sub-system to operate the adjustment mechanism to set a spindle spacing between spindle axes of a corresponding pair thereof, the spindle spacing being equal to the spacing from one another of said pair of second screw fasteners.

11. The apparatus as claimed claim 1, further comprising an image acquisition and machine vision sub-system for use in effecting at least one of aligning spindles with the second screw fasteners, rotating the tool about an axis centered on the notional cylinder surface, and monitoring the position of the tool along three mutually perpendicular axes and three angular orientations corresponding to roll, pitch and yaw.

12. The apparatus as claimed in claim 1, wherein the drive mechanism is a spring mechanism.

13. The apparatus as claimed in claim 1, further comprising a sensor sub-system for use in controlling retraction travel of each spindle along an axis parallel to the second direction.

14. The apparatus as claimed in claim 1, wherein one end of each of the spindles is configured to receive and hold respective ones of the first screw fasteners for screw engagement with respective ones of the second screw fasteners.

15. The apparatus as claimed in claim 1, wherein the first base member is a wheel attachment member and the first screw fasteners are screw engageable with the second screw fasteners with a wheel located between the first screw fasteners and the second screw fasteners whereby to fix the wheel to the wheel attachment member.

16. The apparatus as claimed in claim 1, wherein at least one of the spindles is the output shaft of a respective driving unit and is mounted in a housing of the driving unit, the adjustment mechanism is mounted outside the housing, and the position of the axis of said spindle is changed by the adjustment mechanism changing the position of the housing.

17. The apparatus as claimed in claim 16, further comprising a reaction bar having one end integral with the housing.

18. The apparatus as claimed in claim 1, further comprising a plurality of light emitting lasers mounted on the tool and a light monitoring sub-system configured to analyse reflected laser light and, in response thereto, to control position and orientation of the spindles.

19. The apparatus as claimed in claim 1, wherein at least one of the spindles bears a drive profile at one end thereof for drivingly engaging one of the first screw fasteners having a complementary profile when rotary positions of the drive profile and the complementary profile are aligned.

20. The apparatus as claimed in claim 19, further comprising a controller operable to run the motor for axially rotating said at least one spindle in a high torque mode when said one first screw fastener is in screw engagement with one of the second screw fasteners and the drive profile at said spindle end is aligned with the complementary profile of said one first screw fastener.

21. The apparatus as claimed in claim 20, wherein the controller is operable to run the motor in a low torque mode when said one first screw fastener is not in screw engagement with said one second screw fastener or the drive profile at said spindle end is not aligned with the complementary profile of said one first screw fastener.

* * * * *